(12) United States Patent
Yun et al.

(10) Patent No.: US 9,863,330 B2
(45) Date of Patent: Jan. 9, 2018

(54) SYSTEMS AND METHODS OF CONTROLLING VALVE TIMING IN AN ENGINE

(71) Applicant: GM GLOBAL TECHNOLOGY OPERATIONS LLC, Detroit, MI (US)

(72) Inventors: Hanho Yun, Oakland Township, MI (US); Cherian A. Idicheria, Novi, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/147,420

(22) Filed: May 5, 2016

(65) Prior Publication Data
US 2017/0321613 A1    Nov. 9, 2017

(51) Int. Cl.
*F02D 13/02* (2006.01)
*F01L 1/34* (2006.01)
*F02P 23/04* (2006.01)
*F02D 35/02* (2006.01)

(52) U.S. Cl.
CPC ............ *F02D 13/0215* (2013.01); *F01L 1/34* (2013.01); *F02D 35/028* (2013.01); *F02P 23/04* (2013.01); *F01L 2800/09* (2013.01)

(58) Field of Classification Search
CPC .... F02D 13/0215; F02D 35/028; F02P 23/04; F01L 1/34; F01L 2800/09
See application file for complete search history.

(56) References Cited

U.S. PATENT DOCUMENTS

| 8,433,500 | B2 | 4/2013 | Ramappan et al. | |
| 2013/0018565 | A1* | 1/2013 | Yun | F02D 41/3035 701/102 |
| 2013/0174805 | A1* | 7/2013 | Bayer | F02D 41/3035 123/295 |
| 2013/0328477 | A1* | 12/2013 | Katsuraya | H01T 13/20 313/145 |

* cited by examiner

*Primary Examiner* — Jacob Amick
(74) *Attorney, Agent, or Firm* — Quinn IP Law

(57) ABSTRACT

A vehicle includes an engine having a combustion chamber with an inlet and an outlet. Valves and valve actuators regulate open and closing of the inlet and the outlet. A plasma ignition source initiates ignition in the combustion chamber. A controller is in communication with the inlet valve actuator and outlet valve actuator. The controller is configured to detect a transition from a first combustion mode of the engine to a second combustion mode of the engine. The controller is also configured to change at least one of an opening time, a closing time, and an open duration of the first valve in response to detecting the transition.

20 Claims, 6 Drawing Sheets

SYSTEMS AND METHODS OF CONTROLLING VALVE TIMING IN AN ENGINE

TECHNICAL FIELD

The disclosure generally relates to systems and methods of controlling valve timing in an engine.

BACKGROUND

Internal combustion engines may utilize variable valve timing to achieve certain performance, efficiency, and or environmental metrics. In low temperature gasoline combustion operation, with a plasma ignition source, the change in valve timing between one combustion mode and another may cause disruption in operation of the engine and higher noise from the engine.

SUMMARY

In one exemplary embodiment, a method of operating a combustion engine utilizes a plasma ignition source. The engine includes a combustion chamber defining an inlet and an outlet, a first valve regulating one of the inlet and the outlet, and a second valve regulating the other of the inlet and the outlet. The method includes detecting a transition from a first combustion mode of the engine to a second combustion mode of the engine. The method also includes changing at least one of an opening time, a closing time, and an open duration of the first valve in response to detecting the transition.

In one exemplary embodiment, a vehicle includes an engine. The engine includes a combustion chamber defining an inlet and an outlet. A first valve regulates one of the inlet and the outlet. A first valve actuator is operatively connected to the first valve to actuate opening and closing of the first valve. A second valve regulates the other of the inlet and the outlet. A second valve actuator is operatively connected to the second valve to actuate opening and closing of the second valve. The engine also includes a plasma ignition source for initiating ignition in the combustion chamber. A controller is in communication with the first valve actuator and second valve actuator. The controller is configured to detect a transition from a first combustion mode of the engine to a second combustion mode of the engine. The controller is also configured to change at least one of an opening time, a closing time, and an open duration of the first valve in response to detecting the transition.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a system 100 and method 600 of operating an engine 102 are shown and described herein.

Figure 1:
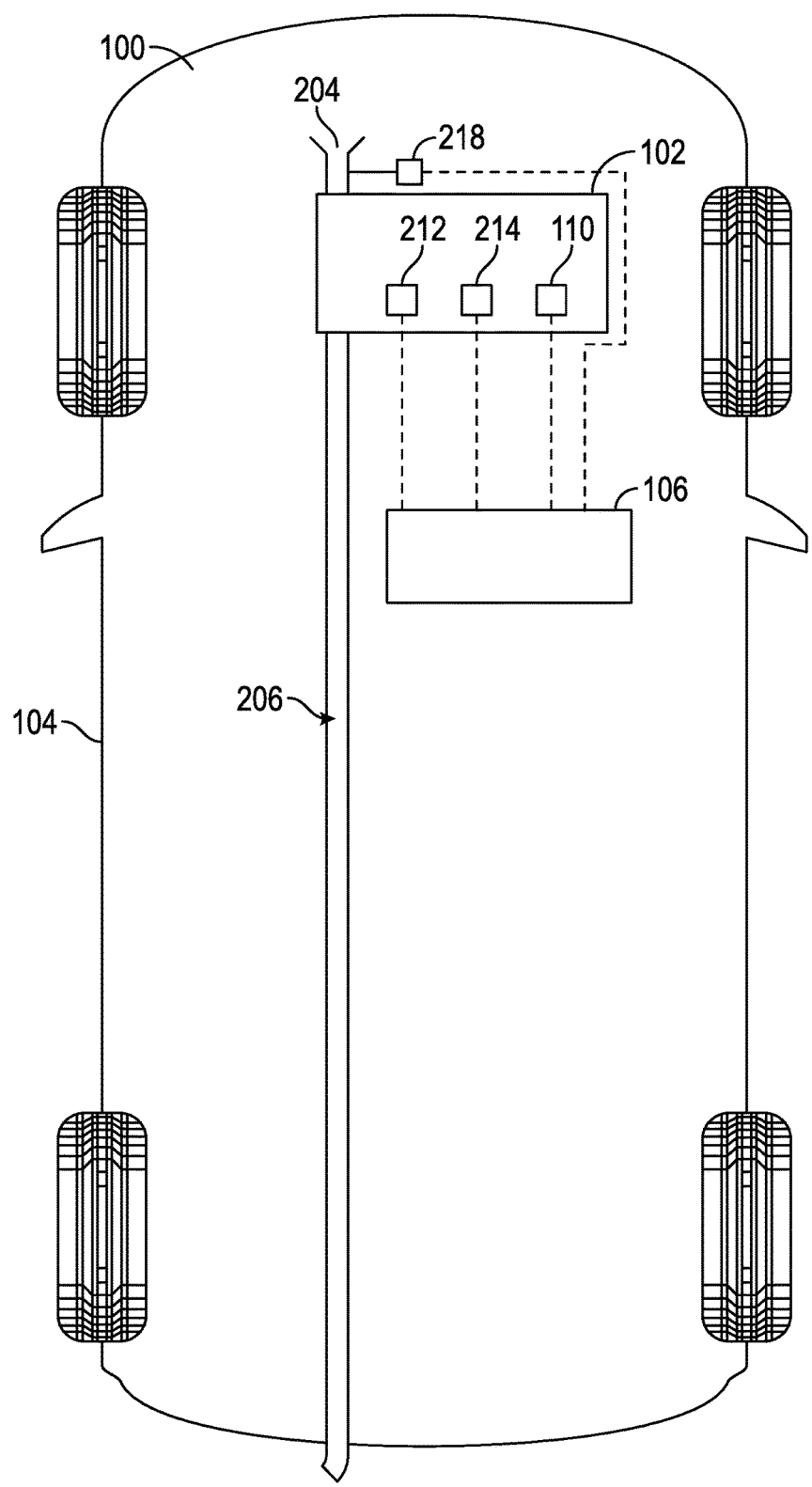
FIG. 1 is a block diagram of a vehicle having an engine with a system for controlling the engine according to one exemplary embodiment.

Referring to FIG. 1, the system 100 may be implemented in a vehicle 104 in one exemplary embodiment. In the exemplary embodiment, the vehicle 104 may be an automobile (not separately numbered). However, it should be appreciated that the system 100 may be implemented in other vehicles 104, including, but not limited to, motorcycles, aircraft, locomotives, and boats. Furthermore, the system 100 shown and described herein may also be implemented in non-vehicle applications (not shown).

Figure 2:
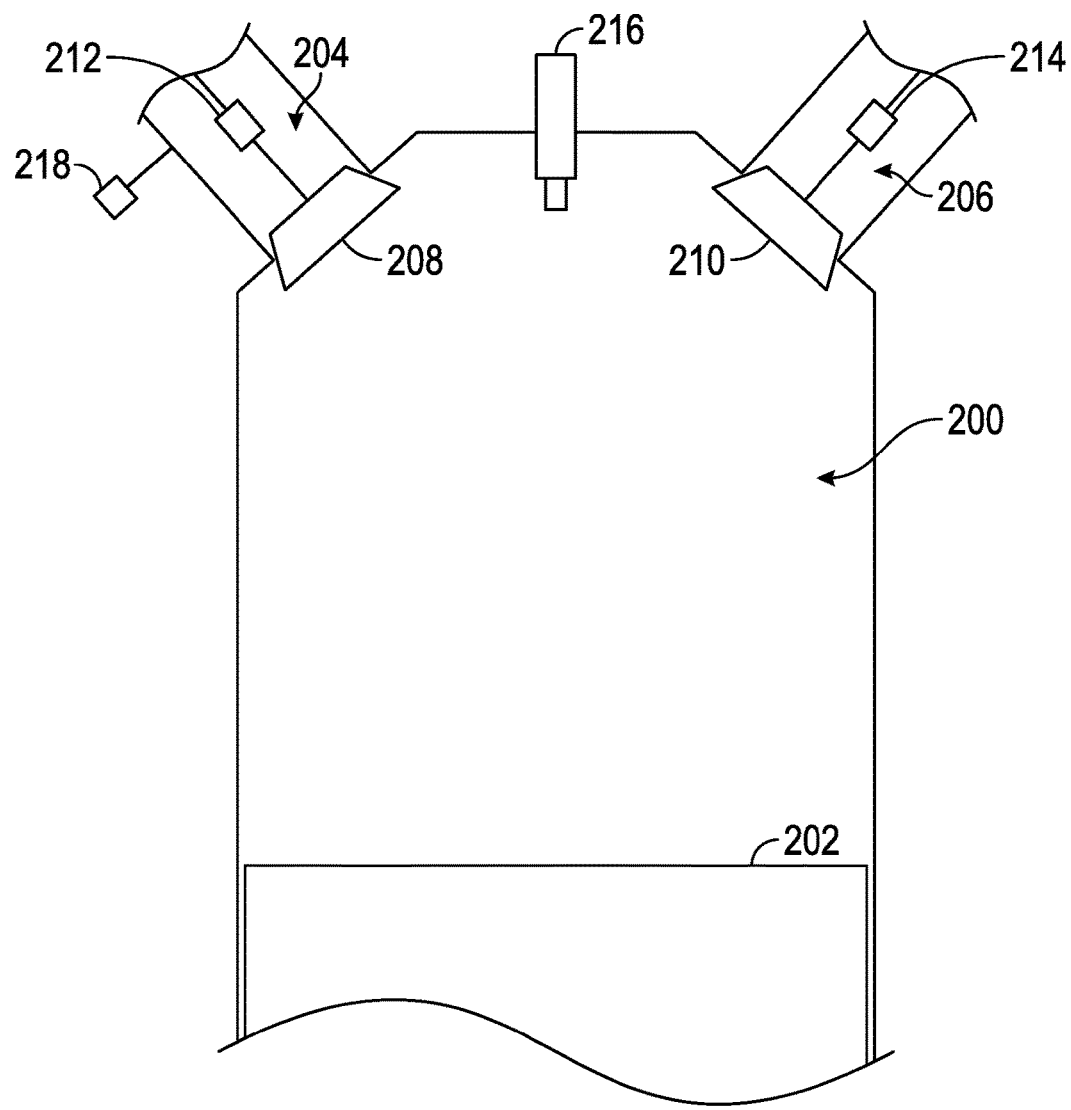
FIG. 2 is a schematic diagram representing a combustion chamber of the engine according to one exemplary embodiment.

The engine 102 shown in the exemplary embodiments is an internal combustion engine (not separately numbered). Referring to FIG. 2, the engine 102 includes at least one combustion chamber 200, commonly referred to as a cylinder. The engine 102 may include a plurality of combustion chambers 200 with a piston 202 configured to reciprocate in each combustion chamber 200, as is well known to those skilled in the art. Each piston 202 is coupled to a crankshaft (not shown) via a connecting rod (not shown), as is also well known to those skilled in the art. However, it should be appreciated that in other embodiments, the engine 102 may be configured differently.

In the exemplary embodiment, the combustion chamber 200 defines an inlet 204 and an outlet 206 as is appreciated by those skilled in the art. The inlet 204 provides for intake air and/or an air-fuel mixture to enter the combustion chamber 200 while the outlet 206 provides for exhaust gas to exit the combustion chamber 200. The engine 102 also includes a first valve 208 and a second valve 210. In the exemplary embodiment shown in FIG. 2, the first valve 208 regulates the inlet 204 and the second valve 210 regulates the outlet 206. That is, in this exemplary embodiment, the first valve 208 opens to allow intake air to enter the combustion chamber 200 and closes to prevent the intake air to enter the combustion chamber 200, while the second valve 210 opens to allow exhaust air to exit the combustion chamber 200 and closes to prevent the exhaust air from exiting the combustion chamber 200. However, it should be appreciated that in other embodiments (not shown), the first valve 208 may regulate the outlet 206 and the second valve 210 may regulate the inlet 204.

The engine 102 also includes a first valve actuator 212 and a second valve actuator 214. The first valve actuator 212 is operatively connected to the first valve 208 to actuate opening and closing of the first valve 208. The second valve actuator 214 is operatively connected to the second valve 210 to actuate opening and closing of the second valve 210.

The actuators 212, 214 are configured to provide variable valve timing ("VVT") or variable valve control ("VVC"). That is, the actuators 212, 214 are configured to vary the timing and/or duration that the respective valves 208, 210 are open. The actuators 212, 214 may be implemented with camshafts (not shown) particularly configured to provide the VVT/VVC. However, other techniques to provide actuation, i.e., opening and closing, of the valves 208, 210 are appreciated by those skilled in the art.

The engine 102 further includes an ignition source 216 disposed in communication with each combustion chamber 200. The ignition source 216 is capable of initiating combustion in the combustion chamber 200. In one exemplary embodiment, the ignition source 216 may be implemented with a low temperature plasma ignition device (not separately numbered). The low temperature plasma ignition device may produce one or more plasma streams to ignite the air/fuel mixture in the combustion chamber 200.

Referring again to FIG. 1, the system 100 includes a controller 106. The controller 106 is configured and capable of performing mathematical calculations and executing instructions, i.e., running a program. The controller 106 may be implemented with one or more of a processor, microprocessor, microcontroller, application specific integrated circuit ("ASIC"), memory, storage device, analog-to-digital converter ("ADC"), etc., as is appreciated by those skilled in the art. The controller 106 of the exemplary embodiment may commonly be referred to as an engine control module ("ECM").

The controller 106 is in communication with the first valve actuator 212 and the second valve actuator 214. As such, in the exemplary embodiment, the controller 106 may regulate the open and close timing and duration of the first valve 208 and the second valve 210. That is, the controller 106 may change the time that each valve 208, 210 opens and closes and how long each valve 208, 210 remains open and closed.

The system 100 may include a fuel injector 218 in communication with the controller 106. The fuel injector 218 supplies fuel into the combustion chamber 200. Those skilled in the art appreciate that the fuel may be injected directly into the combustion chamber 200 and/or to the inlet 204. The controller 106 regulates the amount of fuel supplied by the fuel injector 218. For instance, the controller 106 may regulate a fuel pulse width, i.e., the energizing time of the fuel injector 218. The load on the engine 102 may be determined, at least in part, by the amount of fuel supplied by the fuel injector 218.

Referring again to FIG. 1, the system 100 may also include a speed sensor 110 in communication with the controller 106. The speed sensor 110 is configured to sense the rotational speed of the engine 102. In one embodiment, the speed sensor 110 measures the rotation speed of a crankshaft (not shown) and, thus, an output shaft (not shown) of the engine 102, as is readily appreciated by those skilled in the art. As such, the controller 106 may have access to the rotational speed of the engine 102.

Figure 3:
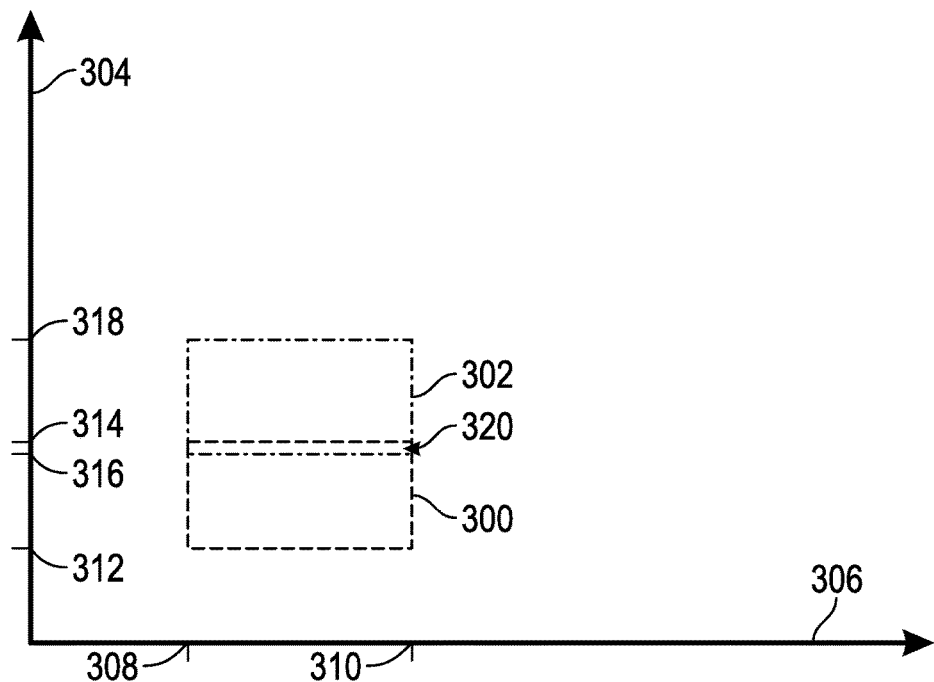
FIG. 3 is a graph showing a first combustion mode and a second combustion mode based on rotational speed of the engine and load on the engine according to one exemplary embodiment.

The controller 106 may also determine and/or receive a combustion mode of the engine 102. The combustion mode may determine various operational parameters of the engine 102. FIG. 3 is a graph illustrating a first combustion mode 300 and a second combustion mode 302 according to one embodiment. These combustion modes 300, 302 are defined by a load on the engine 102, as defined by the vertical axis 304, and a speed of the engine 102, as defined by the horizontal axis 306. Particularly, the combustion modes 300, 302 shown in FIG. 3 are applied to gasoline combustion at low temperatures. However, it should be appreciated that the system 100 and method 600 described herein may also be applied to other fuels and engine temperatures.

The units of the load defined by the vertical axis 304 may be referred to as brake mean effective pressure ("BMEP") and the unit of the speed defined by the horizontal axis 306 may be referred to as revolutions per minute ("rpm"). Of course, other units for the load and speed may alternatively be applied. In this exemplary embodiment, the first combustion mode 300 is defined between a minimum speed 308 and a speed threshold 310 and a first load threshold 312 and a second load threshold 314. The first load threshold may be an idle, i.e., minimum, load of the engine 102. The second combustion mode 302 is defined between the minimum speed 308 and the speed threshold 310 and a third load threshold 316 and a fourth load threshold 318. In this particular embodiment, the second load threshold is greater than the third load threshold and, as such, the combustion modes 300, 302 overlap on the graph. A transitional region 320 defining a transition between the combustion modes 300, 302 may be defined by the overlap.

Figure 4:
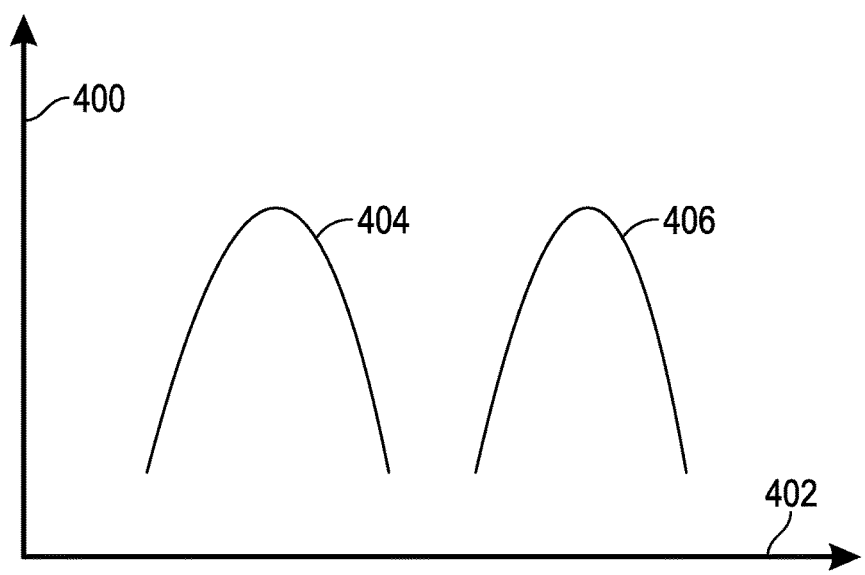
FIG. 4 is a graph showing operation of a first valve and a second valve of the engine during the first combustion mode according to one exemplary embodiment.

In one exemplary embodiment, the first combustion mode 300 may also be referred to as a light load negative valve overlap ("LL NVO") mode (not separately numbered). In this first combustion mode 300, the inlet valve 208 is not open at the same time as the exhaust valve 210. FIG. 4 illustrates the valve timing for the first combustion mode 300. Specifically, in FIG. 4, a vertical axis 400 represents a valve lift distance and a horizontal axis 402 represents time. The opening and closing of the second valve 210 is illustrated by a second valve curve 404 and the opening and closing of the first valve 208 is illustrated by a first valve curve 406.

Figure 5:
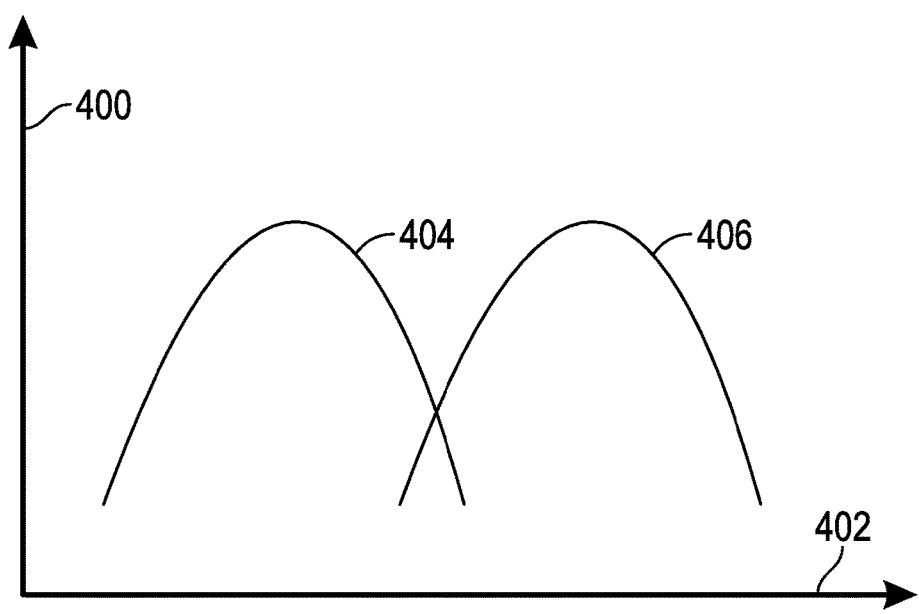
FIG. 5 is a graph showing operation of the first valve and the second valve of the engine during the second combustion mode according to one exemplary embodiment.

In the exemplary embodiment, the second combustion mode 302 may also be referred to as a high load positive valve overlap ("HL PVO") mode (not separately numbered). In this second combustion mode 302, the first valve 208 and the second valve 210 may be open at the same time, thus allowing simultaneous intake and exhaust. FIG. 5 illustrates the valve timing for the second combustion mode 302. Like in FIG. 4, in FIG. 5, the vertical axis 400 represents a valve lift distance and the horizontal axis 402 represents time. The opening and closing of the second valve 210 is illustrated by the second valve curve 404 and the opening and closing of the first valve 208 is illustrated by the first valve curve 406.

Figure 6:
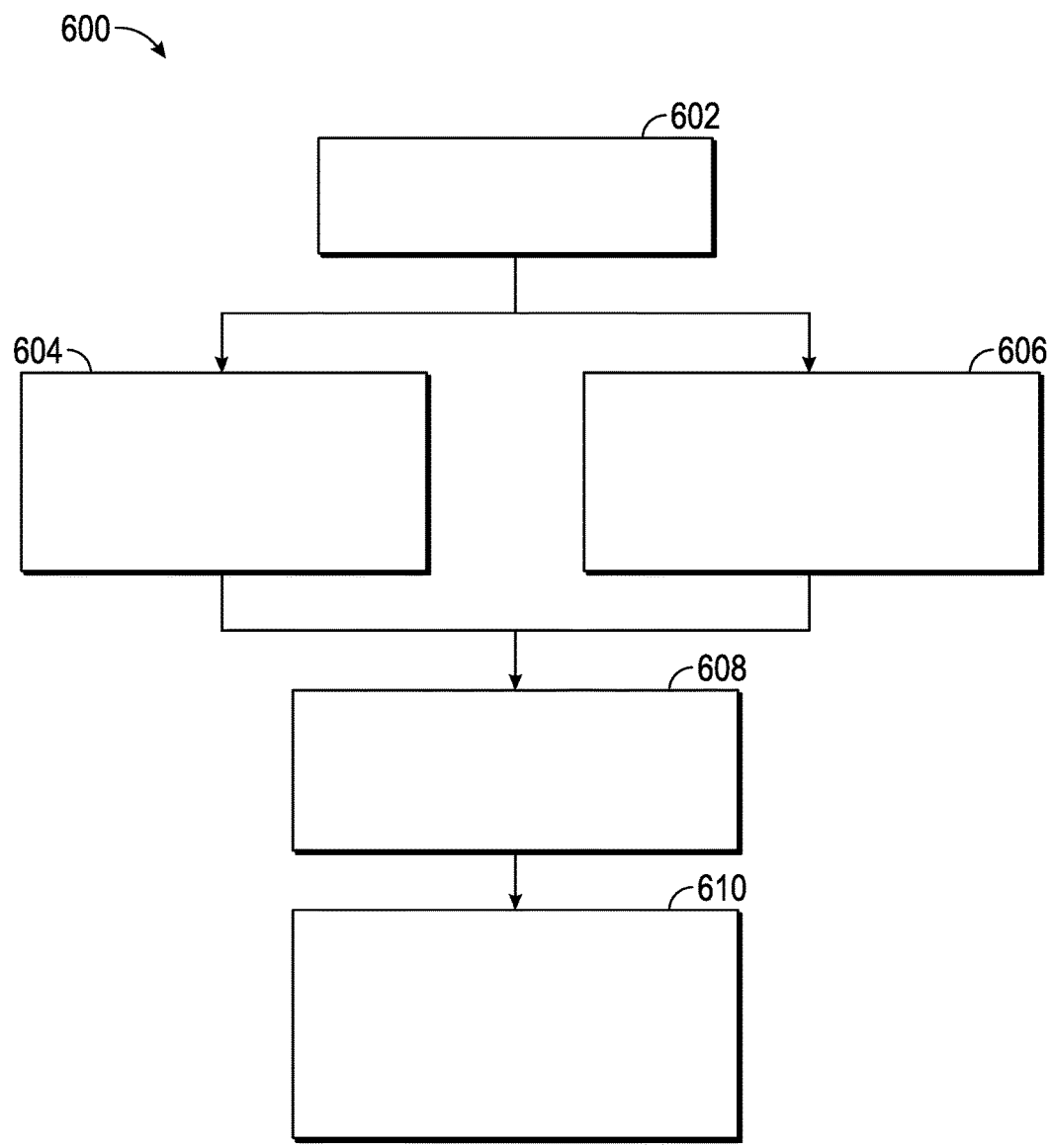
FIG. 6 is a flowchart showing a method of operating the engine according to one exemplary embodiment.

Referring now to FIG. 6, in an exemplary embodiment, a method 600 of operating the engine 102 may utilize the system 100 and controller 106 described above. However, it should be appreciated that other systems, controllers, apparatus, and/or devices may be utilized to perform the method 600 described herein.

The method 600 includes, at 602, detecting a transition from the first combustion mode 300 of the engine 102 to the second combustion mode 302 of the engine 102. In one exemplary embodiment, detecting the transition may include sensing a load of the engine 102. Sensing the load may be accomplished, in part, by utilizing the amount of fuel supplied by the fuel injector 218, e.g., the fuel pulse width, as is appreciated by those skilled in the art. The speed sensor 110 may also be utilized in determining whether the engine 102 is in transition between the first and second combustion modes 300, 302, particularly by determining whether the speed of the engine 102 is outside the predetermined ranges for the first and second combustion modes 300, 302.

In the exemplary embodiment shown in FIG. 3, the transition from the first combustion mode 300 to the second combustion mode 302 occurs when the load and speed of the engine 102 is in the transitional region 320, i.e., when the modes 300, 302 overlap on the graph. However, it should be appreciated that the first and second combustion modes 300, 302 need not "overlap" and that other techniques for determining the transition between the combustion modes 300, 302 may be applied. In one instance, the transition between the first and second combustion modes 300, 302 may occur upon determining that the load of the engine 102 is approaching, i.e., increasing towards or decreasing towards, a predetermined threshold load value.

The method 600 further includes, at 604, changing at least one of an opening time, a closing time, and an open duration of the first valve 208 in response to detecting the transition. The method 600 may also include, at 606, maintaining an opening time, a closing time, and an open duration of the second valve 210 in response to detecting the transition. As such, the timing of the first valve 208 changes during the transition while the timing of the second valve 210 remains the same.

Figure 7:
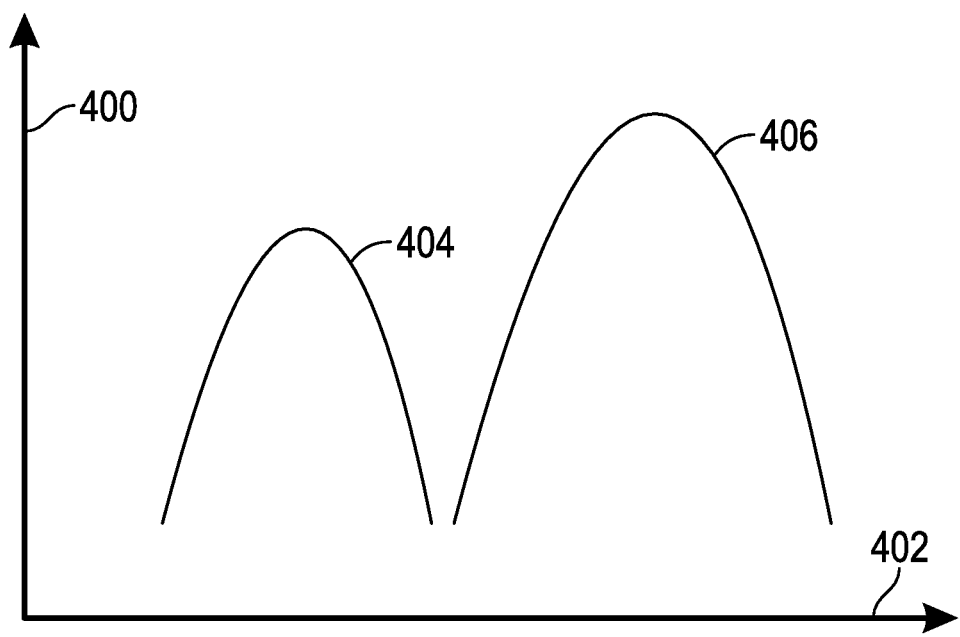
FIG. 7 is a graph showing operation of the first valve and the second valve of the engine during a transition between the first combustion mode and the second combustion mode according to one exemplary embodiment.

In one exemplary embodiment, as shown in FIG. 7, the opening time, closing time, and open duration of the first valve 208 are each changed in response to detecting the transition. That is, the first valve 208 is opened earlier and closed later in response to detecting the transition between the first combustion mode 300 and the second combustion mode 302. That is, the first valve 208, during the transition, is opened earlier in time and closed later in time than when the first valve 208 is opened and closed during the first combustion mode (as shown in FIG. 4).

While the first valve 208 regulates the inlet 204, as shown in the embodiment in FIG. 2, it should be appreciated that the first valve 208 may alternately be utilize to regulate the outlet 206, as previously discussed. As such, during transition, the open duration of the inlet 204 or the outlet 208 may be modified.

Changing the opening time, closing time, and open duration of the first valve 208 as described above provides several advantages. First, overall efficiency of the engine 102 is improved. That is, less fuel is burned by the engine 102. Second, "ringing" noise by the engine may be reduced. Finally, mono-nitrogen oxide ("NOx") emissions may also be reduced.

In the exemplary embodiment described above, the first valve 208 regulates the inlet 204 while the second valve 210 regulates the outlet 206. As such, during transition, the duration that the inlet 204 is open is longer than the duration that the outlet 206 is open. However, it should be appreciated that in other embodiments, the valves 208, 210 may be reversed. As such, the duration the outlet 206 is open is longer than the duration the inlet 204 is open during transition.

It should also be appreciated that, in some embodiments, multiple changes to the opening time, the closing time, and/or the open duration may occur in the first and second valves 208, 210 during the transition. For instance, in one embodiment, the opening time and closing time of the first valve 208 may change two more times during the transition, before reaching the opening time and closing times of the second combustion mode.

The method 600 may also include, at 608, detecting a completing of the transition from the first combustion mode 300 of the engine 102 to the second combustion mode 302 of the engine 102. In one exemplary embodiment, detecting the completion of the transition may include sensing a load of the engine 102. Sensing the load may be accomplished, in part, by utilizing the amount of fuel supplied by the fuel injector 218, e.g., the fuel pulse width, as is appreciated by those skilled in the art. The speed sensor 110 may also be utilized in determining whether the engine 102 has completed the transition between the first and second combustion modes 300, 302.

The method 600 may further include, at 610, changing at least one of an opening time, a closing time, and an open duration of the second valve 210 in response to detecting the completing of the transition. After changing the opening time, the closing time, and/or the open duration of the second valve 210, the opening and closing times of the valves 208, 210 may reflect that of the second combustion mode, as shown in FIG. 5.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of operating a combustion engine utilizing a plasma ignition source, the engine having a combustion chamber defining an inlet and an outlet, a first valve regulating one of the inlet and the outlet, and a second valve regulating the other of the inlet and the outlet, and a fuel injector for suppling fuel to the combustion chamber, the method comprising:
    detecting a transition from a first combustion mode of the engine to a second combustion mode of the engine, wherein the first combustion mode is defined as a load on the engine being between a first load threshold and a second load threshold and a speed of the engine being between a minimum speed and a speed threshold;
    changing at least one of an opening time, a closing time, and an open duration of the first valve in response to detecting the transition; and
    determining the load on the engine based at least partially on an amount of the fuel supplied by the fuel injector.

2. The method as set forth in claim 1 further comprising maintaining an opening time, a closing time, and an open duration of the second valve in response to detecting the transition.

3. The method as set forth in claim 1 further comprising detecting a completing of the transition from the first combustion mode to the second combustion mode of the engine.

4. The method as set forth in claim 3 further comprising changing at least one of an opening time, a closing time, and an open duration of the second valve in response to detecting the completing of the transition from the first combustion mode to the second combustion mode.

5. The method as set forth in claim 3 wherein the first valve is an inlet valve regulating the inlet and wherein changing at least one of the opening time, the closing time, and the open duration of the first valve comprises opening the inlet valve earlier and closing the inlet valve later in response to the detecting of the transition.

6. The method as set forth in claim 5 wherein the second valve is an exhaust valve regulating the outlet and further comprising opening the exhaust valve earlier and closing the exhaust valve later in response to detecting the completing of the transition from the first combustion mode to the second combustion mode.

7. The method as set forth in claim 3 wherein the first valve is an exhaust valve regulating the outlet and wherein changing at least one of the opening time, the closing time, and the open duration of the first valve comprises opening the exhaust valve earlier and closing the exhaust valve later in response to the detecting of the transition.

8. The method as set forth in claim 7 wherein the second valve is an inlet valve regulating the inlet and further comprising opening the exhaust valve earlier and closing the exhaust valve later in response to detecting the completing of the transition from the first combustion mode to the second combustion mode.

9. The method as set forth in claim 1 wherein the second combustion mode is defined as the load on the engine being between a third load threshold and a fourth load threshold and the speed of the engine being between the minimum speed and the speed threshold.

10. A vehicle comprising:
an engine including:
a combustion chamber defining an inlet and an outlet;
a first valve regulating one of the inlet and the outlet;
a first valve actuator operatively connected to the first valve to actuate opening and closing of the first valve;
a second valve regulating the other of the inlet and the outlet;
a second valve actuator operatively connected to the second valve to actuate opening and closing of the second valve;
a plasma ignition source for initiating ignition in the combustion chamber;
a controller in communication with the first valve actuator and the second valve actuator and configured to:
detect a transition from a first combustion mode of the engine to a second combustion mode of the engine; and
change at least one of an opening time, a closing time, and an open duration of the first valve in response to detecting the transition;
a fuel injector for suppling fuel to the combustion chamber, wherein the controller is further configured to determine a load on the engine based at least partially on an amount of the fuel supplied by the fuel injector.

11. The vehicle as set forth in claim 10 wherein the controller is further configured to maintain an opening time, a closing time, and an open duration of the second valve in response to detecting the transition.

12. The vehicle as set forth in claim 10 wherein the controller is further configured to detect a completing of the transition from the first combustion mode to the second combustion mode of the engine.

13. The vehicle as set forth in claim 12 wherein the controller is further configured to change at least one of an opening time, a closing time, and an open duration of the second valve in response to detecting the completing of the transition from the first combustion mode to the second combustion mode.

14. The vehicle as set forth in claim 10 wherein the controller is configured to detect a transition from the first combustion mode to the second combustion mode utilizing at least the determined load on the engine.

15. The vehicle as set forth in claim 10 further comprising a speed sensor for sensing rotational speed of the engine, and wherein the first combustion mode is defined as the load on the engine being between a first load threshold and a second load threshold and the speed of the engine being between a minimum speed and a speed threshold.

16. The vehicle as set forth in claim 15 wherein the second combustion mode is defined as the load on the engine being between a third load threshold and a fourth load threshold and the speed of the engine being between the minimum speed and the speed threshold.

17. The vehicle as set forth in claim 10 further comprising a speed sensor for sensing rotational speed of the engine.

18. The method as set forth in claim 9 wherein the second load threshold is greater than the third load threshold.

19. The vehicle as set forth in claim 10 wherein the plasma ignition source is a low temperature plasma ignition device that produces one or more plasma streams.

20. A vehicle comprising:
an engine including:
a combustion chamber defining an inlet and an outlet;
a first valve regulating one of the inlet and the outlet;
a first valve actuator operatively connected to the first valve to actuate opening and closing of the first valve;
a second valve regulating the other of the inlet and the outlet;
a second valve actuator operatively connected to the second valve to actuate opening and closing of the second valve;
a low temperature plasma ignition source for initiating ignition in the combustion chamber;
a controller in communication with the first valve actuator and the second valve actuator and configured to:
detect a transition from a first combustion mode of the engine to a second combustion mode of the engine; and
change at least one of an opening time, a closing time, and an open duration of the first valve in response to detecting the transition;
wherein the first combustion mode is defined as a load on the engine being between a first load threshold and a second load threshold and a speed of the engine being between a minimum speed and a speed threshold;
wherein the second combustion mode is defined as the load on the engine being between a third load threshold and a fourth load threshold and the speed of the engine being between the same minimum speed as the first combustion mode and the same speed threshold as the first combustion mode; and
wherein the second load threshold is greater than the third load threshold;
wherein the first load threshold is less than the second, third and fourth load thresholds;
wherein the fourth load threshold is greater than the first, second and third load thresholds;
wherein the first and second combustion modes overlap.

* * * * *